March 9, 1937. A. C. RICHARDSON ET AL 2,072,963
METHOD AND APPARATUS FOR FILLING CONTAINERS
Filed Jan. 28, 1935 2 Sheets-Sheet 1
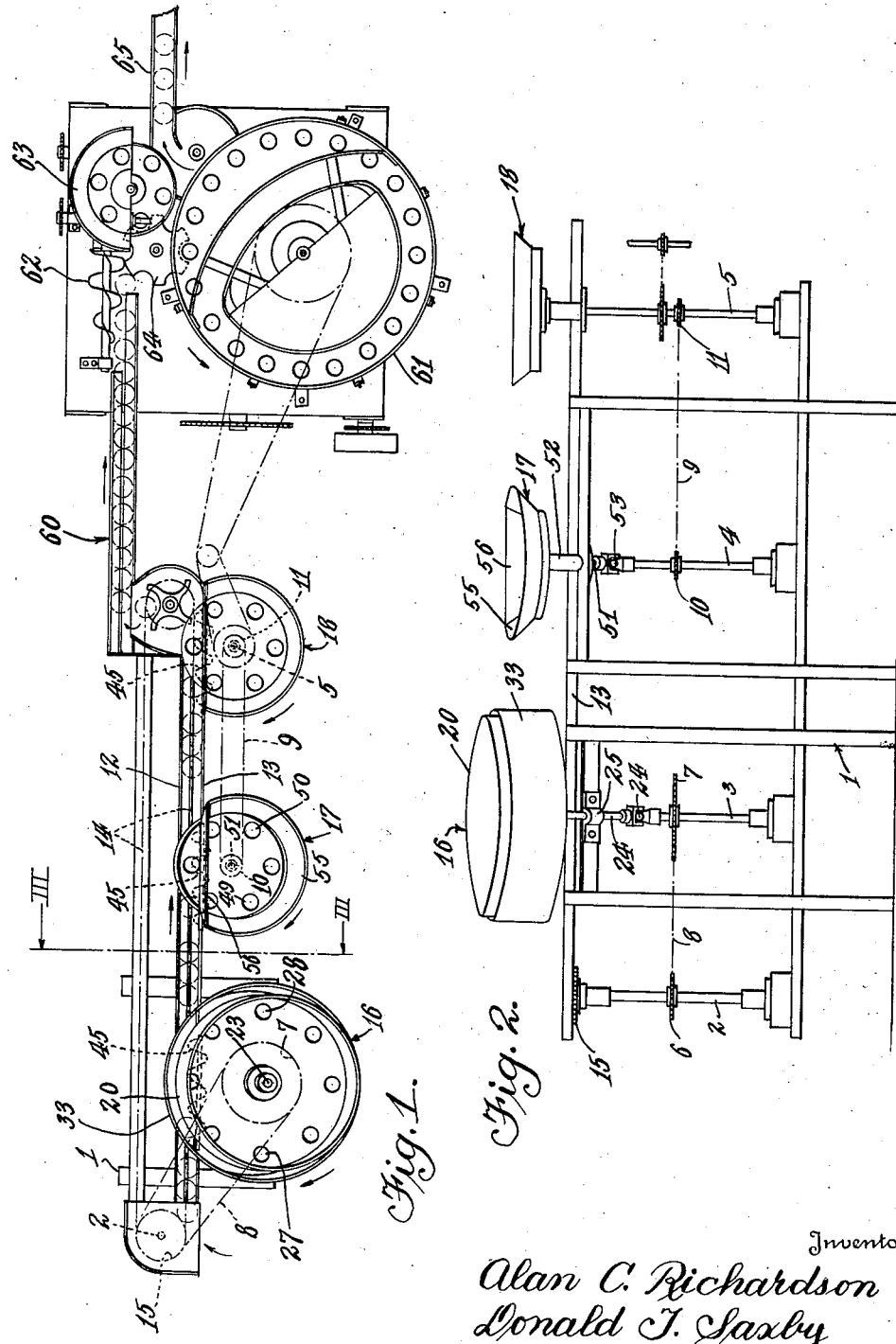
Inventors
Alan C. Richardson
Donald J. Saxby
By Lyon & Lyon
Attorneys March 9, 1937. A. C. RICHARDSON ET AL 2,072,963
METHOD AND APPARATUS FOR FILLING CONTAINERS
Filed Jan. 28, 1935  2 Sheets-Sheet 2
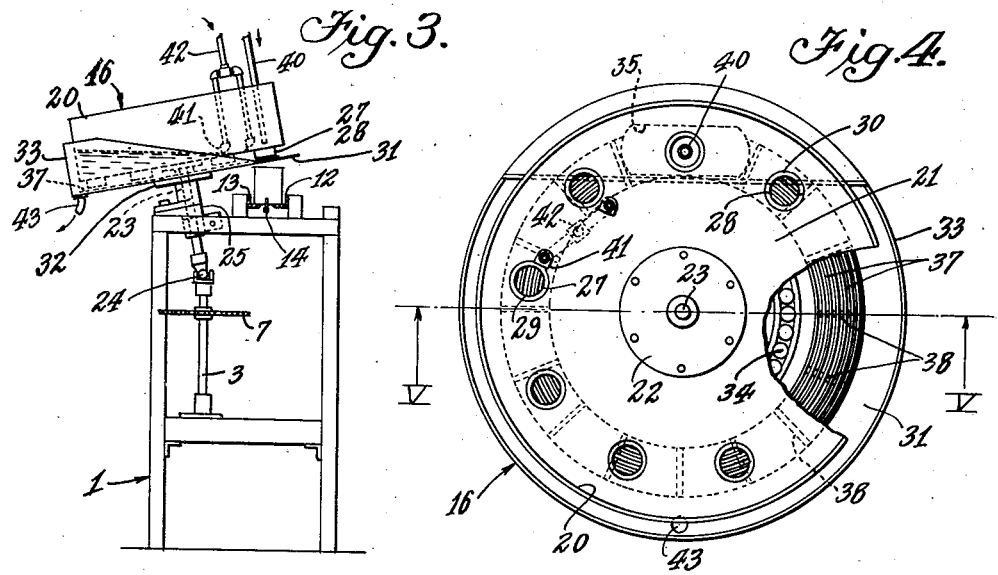
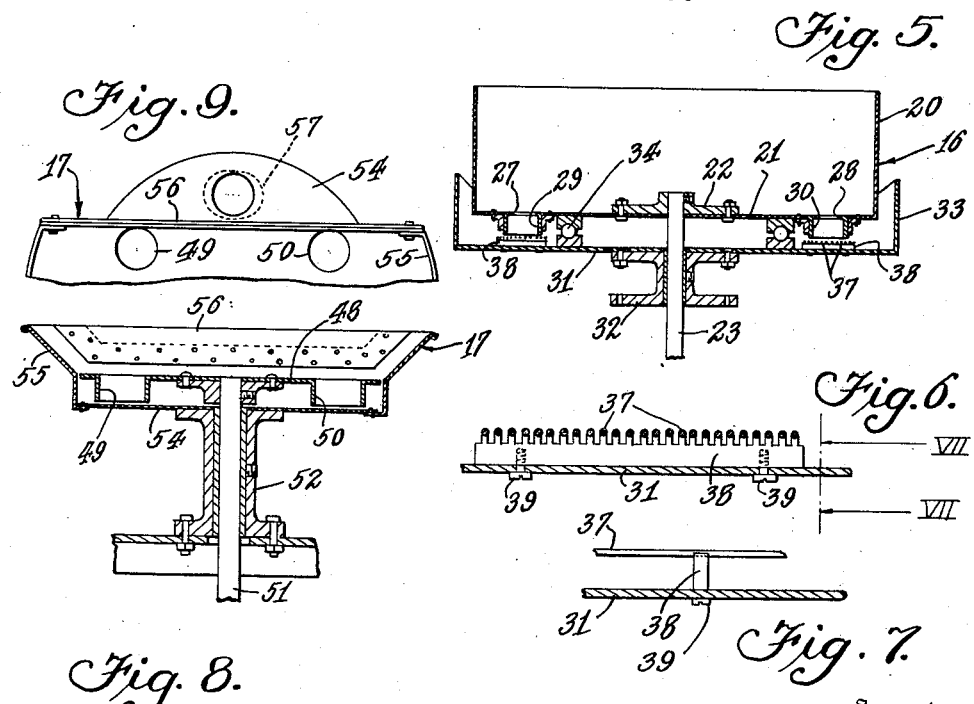
Inventors
Alan C. Richardson
Donald T. Saxby
By Lyon & Lyon
Attorneys Patented Mar. 9, 1937

2,072,963

UNITED STATES PATENT OFFICE 2,072,963

METHOD AND APPARATUS FOR FILLING CONTAINERS

Alan C. Richardson, Berkeley, and Donald T. Saxby, Oakland, Calif., assignors to California Packing Corporation, San Francisco, Calif., a corporation of New York Application January 28, 1935, Serial No. 3,704

10 Claims. (Cl. 226—93)

This invention relates to a method whereby containers may be filled with predetermined volumes of several different kinds or batches of food stuffs and is particularly directed toward a method whereby predetermined volumes of a tender and relatively soft food stuff may be withdrawn from a body of said food stuff and placed in a container.

The invention also relates to an arrangement of elements whereby cans or containers may be automatically filled with predetermined volumes of various types, kinds or varieties of food stuffs.

It is acknowledged that can filling machines per se are old and that machines for completely filling cans with either liquid or bulk material have been described and used heretofore. All of such prior machines, however, were adapted to completely fill the cans, excess material being removed by brushing or scraping the can so as to remove the material extending above normal can top level.

The present invention distinguishes from prior machines in that cans may be filled to any predetermined capacity, not only with one kind or variety of bulk material but with predetermined volumes of different bulk materials.

Although the invention has numerous adaptations and uses, the subsequent detailed description will be limited to the use and adaptation of the invention in the fruit canning industry, for purposes of brevity.

In canning fruits, and particularly mixtures thereof, such mixtures being known as fruit salads and fruit cocktails, the fruit is generally in cut, diced or quartered condition. Small sections of fruit are very tender and easily disfigured, torn or rendered pulpy. For example, it is very difficult to handle halved or quartered cherries without materially impairing their appearance. The present invention permits the introduction of predetermined volumes of various kinds of cut or diced fruit into a container for the purpose of producing a suitable mixture, such as a fruit cocktail, without injury to the fruit. Furthermore, the invention permits the removal of a small and predetermined volume of cut or diced fruit from the body thereof without subjecting the measuring container to mechanical leveling or brushing operations which would tend to injure the fruit.

Generally stated, this is accomplished in accordance with this invention by providing an inclined rotating turret head provided with measuring containers, the turret head containing a large body of the diced or cut fruit and fruit juices or other fluids, in quantities sufficient to render the body relatively mobile. The measuring containers are thereby passed beneath or into the body of fruit and liquid and then gradually withdrawn therefrom, excessive quantities of fruit being removed by a spray of juice or other fluid.

It will be seen that as each empty measuring container passes below the water level in the inclined turret head, a new outlet for the impounded water is formed, thus producing a current which deposits the pieces of fruit gently in the measuring container. Control of the rapidity of this outflow is exercised by regulating the water level in the lower hopper, to the end that the proper outflow for each type of material may be obtained.

During passage of the measuring container through the body of fruit, the juice or liquid is permitted to drain from the lower portion of the measuring container, thereby permitting a predetermined volume of fruit to be discharged into a can or other container without excessive quantities of juice.

An object of this invention, therefore, is to disclose and provide a method of removing small but predetermined volumes of fruit from a body thereof without injury thereof.

Another object is to disclose and provide a combination of means whereby predetermined volumes of tender food stuffs may be removed from a body thereof and automatically discharged into cans or containers.

Another object is to disclose and provide a combination of means whereby predetermined small volumes of various food stuffs may be fed into containers for the purpose of forming mixtures of fruits or food stuffs in such container.

These and other objects, uses and advantages of the invention will become apparent to those skilled in the art from the following detailed description, in which:

Fig. 1 is a plan view illustrating one complete form of apparatus capable of filling cans with a number of predetermined volumes of different food stuffs.

Fig. 2 is a side elevation of a portion of the means shown in Fig. 1.

Fig. 3 is a transverse section taken along the plane III—III of Fig. 1.

Fig. 4 is an enlarged plan view, partly broken away, of the turret head shown in Fig. 3.

Fig. 5 is an axial section taken along the plane V—V of Fig. 4.

Fig. 6 is an enlarged view of a portion of Fig. 5.

Fig. 7 is a side elevation of Fig. 6.

Fig. 8 is a vertical sectional of a modified form of turret head.

Fig. 9 is a partial plan view of the head shown in Fig. 8.

As shown in the drawings, the apparatus may include a frame indicated at 1, provided with a conveyor. Carried by the frame there are journaled a number of vertical driving shafts, such as the shafts 2, 3, 4 and 5. Means for driving said shafts are not shown but the shafts 2 and 3 are shown coupled by means of sprockets 6 and 7 and a chain 8, whereas the shafts 4 and 5 are coupled by means of a chain 9 passing over sprockets 10 and 11 mounted on shafts 4 and 5 respectively. The frame 1 may be provided with a can conveying mechanism such as, for example, channels 12 and 13 and a conveyor element 14 positioned therebetween, said conveyor element being driven by a sprocket 15 mounted on the shaft 2.

The frame 1 is provided with three feeding heads, generally indicated at 16, 17 and 18. The feeding head 18 may be mounted directly upon the shaft 5 whereas the heads 16 and 17 may be inclined. For example, the head 16 may comprise a turret 20 provided with cylindrical side walls and a bottom plate 21. The bottom plate may be provided with a spider or flange 22 suitably connected to the upper end of a shaft 23 as, for example, by means of set screws. The shaft 23 is connected to the upper end of drive shaft 3 by means of a universal joint 24, the shaft 23 being supported in an inclined position by means of a bearing 25 carried by the frame 1. Ordinarily, it has been found that the axis of the shaft 23 should be inclined from about 10° to 15° with respect to the vertical.

The bottom 21 of the turret 20 is provided with a plurality of spaced ports 27 and 28 which lead to cylindrical measuring cups or cylinders 29 and 30 suitably attached to the bottom 21 of the turret. Positioned beneath the turret 20 is a stationary plate 31 supported by a bushing 32 through which the shaft 23 extends. The bushing 32 is suitably attached to the frame 1. The bottom plate 31 supports a housing 33 which may be cylindrical or which may be partially cut away, as indicated in Fig. 3. A suitable ball bearing or other anti-friction means may be introduced between the bottom plate 21 of the turret 20 and the stationary plate 31, as indicated at 34. The bottom plate 31 may also be provided with an elongated aperture 35, as shown in dotted lines in Fig. 4, this aperture being positioned immediately above the position assumed by a can or other container passing the filling head 16 on the guide rails 12 and 13. Mounted upon the bottom plate 31 is a circular track connecting opposing ends of the aperture 35. This track may comprise wires 37 carried upon supporting bars 38, said supporting bars being attached to the bottom plate 31 in any suitable manner, as for example, by means of the screws 39. The wire track 37 is positioned immediately beneath the measuring cups 29, 30, etc., carried by the revolving turret 20.

Positioned vertically above the port 35 in the bottom member 31 is a downwardly directed conduit 40 supplied with steam, compressed air or other gas. In the event the turret 20 revolves in a clockwise direction, a spray head 41 supplied with fluid through a line 42 is positioned to the left of the port 35 immediately above the plane of the bottom member 21 of the turret 20, said spray being pointed in a direction opposed to the direction of rotation of the turret 20. The conduit 42 may also be provided with a branch line provided with a relatively large opening for the purpose of supplying suitable liquid to the interior of the turret 20.

In operation, the turret 20 may be filled with quartered or halved cherries or other food stuff in relatively small and tender pieces. When cherries are used, a sufficient amount of water is introduced into the turret 20 to maintain the bulk of the fruit in a mobile form. Obviously, water will also fill the housing 33 but at no time should the water level be sufficient to cause discharge through the port 35. A valved outlet 43 may be provided at the lower end of the stationary housing 33 for the purpose of permitting excess water to be discharged.

Empty cans are fed into position beneath the port 35 by means of the conveyor 14. The conveyor 14 is preferably driven at a speed slightly in excess of that needed to supply cans to the feeding head 16, the cans being suitably spaced and fed into position beneath the port 35 of the head 16 by means of a conical worm, indicated in dotted lines at 45 in Fig. 1. Means for driving the worm 45 in timed relation with the turret 20 are not shown. The measuring cups 29, 30, etc., carried by the revolving turret 20, pass from their upper position downwardly beneath the mobile body of cherries and water, the lower portions of the measuring cups first becoming partly filled with water by being dipped in the water impounded in the pan or housing 33. The cherries then flow into the measuring cups, the water present in such cups preventing the cherries from being bruised by a forcible contact with the wire track 37. Continued rotation of the turret 20 lifts the measuring cups from beneath the body of fruit, the cups being leveled off and excess fruit removed therefrom by the water spray 41. Simultaneously, the measuring cups are being moved upwardly on the wire track 37, the liquid draining from such cups so that when the cup reaches a position above the port 35, it can discharge its contents into the can, moving therebeneath along the guide rails 12 and 13.

In order to facilitate the discharge of the entire contents of the measuring cups into the containers, a jet of steam or compressed air may be supplied by conduit 40, said jet being directed axially through the measuring cup and directed into the can or container. It is to be understood that the measuring cups 29 and 30 are removable and may be varied in size.

The feeder head 17 is a modified form and comprises a rotatable plate 48 provided with a plurality of measuring cups 49 and 50. This plate is attached to the end of shaft 51 journaled in a bearing 52 suitably attached to the frame 1. The shaft 51 is connected by means of a universal joint 53 to the driven shaft 4. This shaft 51 may be at an angle of say 10° to 15° with respect to the vertical. Although the measuring cups 49 and 50 are cylinders open at both ends, the lower ends of said cylinders are in slidable contact with a stationary plate 54 provided with a hopper-like, upwardly extending side member 55. A partition member 56 may subtend a chord of the hopper 55 at the upper end of the head, the lower edges of the partition 56 being provided with a yieldable strip of rubber composition or the like capable of gently brushing excess fruit from the top of the cups. The bottom plate 54 is provided with an aperture, indicated at 57 (Fig. 9) so that the filled and leveled cups may be discharged through the port into cans moving in spaced and timed relation beneath said port.

When the feeder head 16 is used on cherries and the final canned product is to comprise a fruit cocktail, then the feeder head 17 may be used for grapes and the feeder head 18 on diced pineapple. The feeder head 18 may be similar to 17 but need not be inclined to the vertical.

After containers have been partially filled by the filler heads 16, 17 and 18, they may be moved onto another conveyor, generally indicated at 60, which supplies the partially filled cans to a filling head, generally indicated at 61, adapted to completely fill the cans with diced peaches, pears, apricots and other fruits. The containers supplied by the conveyor 60 may be fed by means of the conical screw 62 to a preliminary filling head 63 and then advanced by means of the star wheel 64 to the main filling head 61 from which the filled cans may be removed and discharged by the conveyor 65. Detailed constructions of the auxiliary feeding head 63 and the main filling head 61 need not be given here as they have been heretofore described in a co-pending application to Shumate, Serial No. 737,408. The auxiliary feeder 63 may be dispensed with if desired.

It will be evident from the description given hereinabove that means have been provided for moving cans and other containers in succession into operative relation with a plurality of feeding heads capable of discharging regulated and predetermined volumes of food stuffs into said cans. Means have also been provided whereby tender, delicate, comminuted food stuffs, such as grapes, cherries, etc., may be measured out and discharged into containers without injury to the delicate fruit. Means have also been provided whereby measuring cups may be leveled off without subjecting the fruit to abrasion or rubbing and completely discharged from the cups without the necessity of mechanically and forcibly pushing the comminuted fruit from such cups. In other words, automatic means have been provided for these operations which heretofore have been accomplished by hand.

Although a particular form and arrangement of apparatus has been described, it is to be understood that numerous changes and modifications may be made. Fig. 1 illustrates an arrangement whereby five separate feeding operations may take place at the same time (or serially) upon a single can but it is understood that instead of using the various types of feeding heads disclosed, two or more heads similar to feeding head 16 may be used. All such changes and modifications as come within the scope of the appended claims are embraced thereby.

We claim:

1. In a method of filling containers with a predetermined volume of tender fruit, the steps of filling a measuring cup with a mobile body of fruit and water, leveling said cup by passing a spray of water across the upper edges of said cup, draining the cup, and then ejecting the contents of said cup into a container by the application of a blast of gas axially through said cup.

2. In a filling head, a rotatable turret mounted upon a shaft inclined with respect to the vertical, said turret being provided with sides adapted to retain a mobile body of fruit and liquid, a plurality of spaced feeding cups carried by said turret, a stationary housing partially enclosing said turret and adapted to collect liquid, and stationary draining means carried by said housing and adapted to slidably contact the lower ends of said measuring cups.

3. In a filling head, a rotatable turret mounted upon a shaft inclined with respect to the vertical, a plurality of spaced feeding cups carried by said turret, a stationary housing partially enclosing said turret, stationary draining means carried by said housing and adapted to slidably contact the lower ends of said measuring cups, and stationary spray means positioned within said turret and adapted to direct a spray across the upper edges of the measuring cups.

4. In a feeding head, a shaft inclined to the vertical, a turret head mounted for rotation on said shaft, measuring cups carried by the bottom portion of said turret, a stationary plate positioned beneath said turret and measuring cups, drainage means carried by said stationary plate, said drainage means being adapted to operatively close the lower ends of said measuring cups to retain solids in said cups while permitting liquid to pass therethrough, and a port in the upper portion of said stationary plate and drainage means, said turret head being provided with sides adapted to retain a mobile fluid body of comminuted fruit in the lower portions, the inclination of said shaft being sufficient to permit said cups to be moved above said mobile body at the upper point in the rotation of said turret.

5. In a feeding head, a shaft inclined to the vertical, a turret head mounted for rotation on said shaft, measuring cups carried by the bottom portion of said turret, a stationary plate positioned beneath said turret and measuring cups, drainage means carried by said stationary plate, said drainage means being adapted to operatively close the lower ends of said measuring cups to retain solids in said cups while permitting liquid to pass therethrough, a port in the upper portion of said stationary plate and drainage means, a downwardly directed spray means adapted to remove excess material from said cups, and a downwardly directed gas conduit positioned above said port.

6. In a device for feeding predetermined quantities of food stuffs into containers, the combination of a rotatable shaft inclined from about 10° to 15° from the vertical, a stationary housing around the upper portion of said shaft, said housing including a bottom plate in a plane at right angles to the shaft axis; a turret head carried by the upper portion of said shaft and rotatable within said housing, said head including a bottom member spaced from the bottom plate of said housing, open ended measuring cups carried by said bottom member, said turret head also being provided with sides adapted to retain a mobile body of fruit and liquid; a port in the upper section of said bottom plate, and a drainage track carried by said bottom plate and leading to opposing sides of said port, said track lying in a plane immediately below the lower ends of said cups, whereby said cups, during rotation of said turret, are immersed below the body of mobile fruit and liquid and then raised along said drainage track to a position above said body of mobile fruit and liquid.

7. In a device for feeding predetermined quantities of food stuffs into containers, the combination of a rotatable shaft inclined from about 10° to 15° from the vertical, a stationary housing around the upper portion of said shaft, said housing including a bottom plate in a plane at right angles to the shaft axis, a valved outlet at the lower portion of said housing; a turret head carried by the upper portion of said shaft and rotatable within said housing, said head including a bottom member spaced from the bottom plate of said housing, open ended measuring cups carried by said bottom member; a port in the upper section of said bottom plate, a drainage track carried by said bottom plate and leading to opposing sides of said port, said track lying in a plane immediately below the lower ends of said cups, and spray means positioned in said head and directed downwardly across the upper edge of the measuring cups.

8. In a device for feeding predetermined quantities of food stuffs into containers, the combination of a rotatable shaft inclined from about 10° to 15° from the vertical, a stationary housing around the upper portion of said shaft, said housing including a bottom plate in a plane at right angles to the shaft axis, a valved outlet at the lower portion of said housing; a turret head carried by the upper portion of said shaft and rotatable within said housing, said head including a bottom member spaced from the bottom plate of said housing, open ended measuring cups carried by said bottom member; a port in the upper section of said bottom plate, a drainage track carried by said bottom plate and leading to opposing sides of said port, said track lying in a plane immediately below the lower ends of said cups, spray means positioned in said head and directed downwardly across the upper edge of the measuring cups, and a downwardly directed conduit in said head above said port whereby gas discharged by said conduit may blow food stuffs from said measuring cups through said port.

9. In a method of removing a predetermined volume of comminuted tender fruit from a body thereof without compressing or mashing said fruit, the steps of: adding water to a body of comminuted fruit to render the same mobile; introducing a measuring cup into said body to first permit liquid from said body to enter the cup through the bottom thereof, and then to permit the mobile body of fruit and water to fill the cup through the top thereof, withdrawing the cup and fruit contained therein from said body, and simultaneously draining liquid therefrom.

10. In a method of removing a predetermined volume of comminuted tender fruit from a body thereof without compressing or mashing said fruit, the steps of: adding water to a body of comminuted fruit to render the same mobile; introducing a measuring cup into said body to first permit liquid from said body to enter the cup through the bottom thereof, and then to permit the mobile body of fruit and water to fill the cup through the top thereof, withdrawing the cup and fruit contained therein from said body and simultaneously draining liquid therefrom, and then leveling said cup by passing a spray of water across the upper edges thereof to remove excess fruit.

ALAN C. RICHARDSON.
DONALD T. SAXBY.